United States Patent
Dotan-Cohen et al.

(10) Patent No.: US 10,740,794 B2
(45) Date of Patent: Aug. 11, 2020

(54) PERSONALIZED IDENTIFICATION OF VISIT START

(71) Applicant: MICROSOFT TECHNOLOGY LICENSING, LLC, Redmond, WA (US)

(72) Inventors: Dikla Dotan-Cohen, Herzliya (IL); Ido Cohn, Tel Aviv (IL); Sagi Hilleli, Rishon Lezion (IL); Jonathan Rabin, Herzliya (IL)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 628 days.

(21) Appl. No.: 15/433,346

(22) Filed: Feb. 15, 2017

(65) Prior Publication Data
US 2018/0232764 A1 Aug. 16, 2018

(51) Int. Cl.
*G06Q 30/02* (2012.01)
*H04W 4/029* (2018.01)
*H04L 29/08* (2006.01)
*H04W 4/021* (2018.01)

(52) U.S. Cl.
CPC ..... *G06Q 30/0255* (2013.01); *G06Q 30/0201* (2013.01); *G06Q 30/0252* (2013.01); *G06Q 30/0261* (2013.01); *H04L 67/22* (2013.01); *H04L 67/306* (2013.01); *H04W 4/021* (2013.01); *H04W 4/029* (2018.02)

(58) Field of Classification Search
CPC .................................................. G06Q 30/02
See application file for complete search history.

(56) References Cited

U.S. PATENT DOCUMENTS

| 8,135,505 | B2 | 3/2012 | Vengroff et al. |
| 8,229,458 | B2 | 7/2012 | Busch |
| 8,751,427 | B1 | 6/2014 | Mysen et al. |

(Continued)

OTHER PUBLICATIONS

Matekenya, et al., Enhancing Location Prediction with Big Data: Evidence from Dhaka, In Proceedings of the ACM International Joint Conference on Pervasive and Ubiquitous Computing: Adjunct, Sep. 12, 2016, pp. 753-762.

(Continued)

*Primary Examiner* — Vincent M Cao
(74) *Attorney, Agent, or Firm* — Shook, Hardy and Bacon, L.L.P.

(57) ABSTRACT

Pieces of location history data corresponding to an identified place of interest are obtained. Each piece of the obtained location history data references one or more signals detected at the identified place of interest and also references temporal data that corresponds to the detected signal(s). Some of the obtained pieces of location history data that represent one or more short, pass-through visits at the identified place of interest are identified. Based on the identified pieces that represent the short visit(s), conditions for determining the intent of future detected location visits at the identified place of interest are generated. The generated conditions can then be employed to determine that a detected location visit of a particular computing device determined to be at the identified place of interest is an extended visit as opposed to a short visit.

20 Claims, 5 Drawing Sheets

(56) References Cited

U.S. PATENT DOCUMENTS

| | | |
|---|---|---|
| 8,949,013 B2 | 2/2015 | Yang et al. |
| 9,282,161 B1 * | 3/2016 | Hill ................ H04L 67/306 |
| 9,367,589 B1 | 6/2016 | Swietlicka et al. |
| 2007/0005419 A1 * | 1/2007 | Horvitz ............ G06Q 30/02 |
| | | 701/533 |
| 2008/0133336 A1 | 6/2008 | Altman et al. |
| 2010/0070334 A1 * | 3/2010 | Monteverde ........ G06Q 30/02 |
| | | 705/14.58 |
| 2011/0090080 A1 * | 4/2011 | Yu .................. G06Q 30/0201 |
| | | 340/539.13 |
| 2013/0227026 A1 | 8/2013 | Jayaram et al. |
| 2013/0318077 A1 * | 11/2013 | Greenzeiger ........ G06F 16/29 |
| | | 707/724 |
| 2014/0236669 A1 | 8/2014 | Milton |
| 2014/0355592 A1 * | 12/2014 | Camps .............. H04W 4/023 |
| | | 370/338 |
| 2016/0063597 A1 | 3/2016 | Goulart |
| 2016/0078485 A1 | 3/2016 | Shim et al. |
| 2016/0189228 A1 | 6/2016 | Vaccari |
| 2017/0012812 A1 * | 1/2017 | Gotoh .............. H04W 4/027 |

OTHER PUBLICATIONS

Zhu, et al., "Exploiting mobility for location promotion in location-based social networks", In Proceedings of International Conference on Data Science and Advanced Analytics, Oct. 30, 2014, 7 pages.

* cited by examiner

PERSONALIZED IDENTIFICATION OF VISIT START

BACKGROUND

The prevalence of mobile computing devices has opened up a world of possibilities with regards to location tracking and the provision of information based on such contextual data. Various forms of location-based applications have been developed to detect when a user has arrived at a particular location or venue, such as a store or other geographic locus. For instance, marketers have harnessed this technology to alert users with electronic advertisements or incentives (e.g., coupons), communicated to the user's mobile computing devices, simply based on a determination that the user has arrived at a particular store. Such features can be extremely useful in instances where the user has intended that the store be their intended destination. However, these alerts may prove to be somewhat of an annoyance to those who are simply passing by the store. False alarms, unwanted advertisements, and repetitive alerts received on a personal computing device can easily influence one to disable these potentially useful features.

SUMMARY

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

Embodiments described in the present disclosure are directed towards determining that a detected location visit at a place of interest is intended by a user. In other words, embodiments can analyze location history data for one or more user accounts, corresponding to particular place(s) of interest (e.g., venues, stores, user hubs), and identify those pieces of location history data that infer short visits at the particular places of interest. In essence, the pieces of location history data representing particular visits where the user simply passed through or nearby a place of interest can be identified and distinguished from other visits to the place of interest, where the user remained for at least a short while. A number of variables obtained from one or more user profiles, including location history data, among other things, can be analyzed to generate certain conditions that can be employed to determine whether future detected location visits at a particular place of interest is intended by a particular user, or any user, as will be described.

In some embodiments, pieces of location history data associated with a particular user account can be obtained for analysis. As noted, each piece of location history data can correspond to an identified place of interest. That is, each piece of location history data in or associated with the particular user account can reference a particular geographic locus, venue, GPS coordinate, address, user hub (e.g., "home," "office," "mom's house"), or some other location identifier.

Each piece of location history data can also include references to one or more signals that were detected, by one or more computing devices associated with the particular user account, while the one or more computing devices were located at an identified place of interest. Signals that were sensed, or in other words detected by the computing device (s) associated with the particular user account, can be stored as references with location history data associated with the particular user account. Temporal data associated with the detection of these signals can also be stored with the location history data. In this way, a duration of a particular visit can be determined based on the detected signals and the temporal data associated therewith.

Some pieces of the location history data may indicate that a user, carrying their one or more computing devices associated with the particular user account, made an extended visit to the identified place of interest. For instance, a set of location history data may include a plurality of records including detected signals and their corresponding detection times. A relatively consistent set of detected signals over an extended period may be utilized to make an inference that the user intended to stay at the particular place of interest. However, some sets of location history data may indicate that signals detected at an identified place of interest had changed over a relatively short period of time and were no longer detected shortly thereafter. This set of data may be utilized to make an inference that the user simply passed by the particular place of interest.

Utilizing the identified pieces of location history data that infer brief or pass-through visits (hereinafter referenced as "short visit(s)") at the identified place of interest, a set of conditions are generated. The set of conditions is generated for purposes of determining whether a future location visit detected by one of the computer devices associated with the user account is an extended visit where the user will remain at the identified place of interest, as opposed to a short visit where the user is simply passing by or through the identified place of interest. In embodiments, the set of conditions can include, among other things, one or more signals detected at the identified place of interest, and a determined duration that serves as a threshold duration, for determining that a particular visit is short or extended.

As new location data is received from one of the computing devices associated with the user account, where the received location data references at least a portion of the signals previously detected at the identified place of interest, the generated set of conditions for the identified place of interest is utilized to determine whether a minimum number of appropriate signals is detected, and whether the signals are still present after the threshold duration. In this way, if a user typically passes by or through a particular place of interest, and a detected visit is determined to be extended visit (e.g., a visit lasting beyond the threshold duration), communications can be appropriately transmitted to the user's computing device without concern that the communication is irrelevant to the user for the detected visit.

In some other embodiments, pieces of location history data from many user accounts, which also correspond to the place of interest, can be obtained for analysis. As disclosed herein, a plurality of user accounts may include location history data that can be utilized to make an inference that each user simply passed by or through the particular place of interest. As described above, a set of conditions can be generated for purposes of determining whether future location visits detected by any computing device is an extended visit, as opposed to a short visit. As new location data is received from a computing device(s), where the received location data references at least a portion of the signals previously detected at the identified place of interest, the generated set of conditions for the identified place of interest is utilized to determine whether a minimum number of appropriate signals is detected, and whether the signals are still present after the threshold duration. In this way, if users typically pass by or through a particular place of interest, and a detected visit is determined to be extended visit, communications can be appropriately transmitted to the user's computing device without concern that the communication is irrelevant to the user for the detected visit.

In some further embodiments, the generated set of conditions can include additional rules or conditions, in both temporal and contextual domains. In one instance, a particular set of conditions can be generated and/or modified based on time of day (e.g., specific times, mornings, afternoons, evenings), days of week, weekends vs. weekdays, months, seasons, and the like. In another instance, a particular set of conditions can be generated and/or modified based on contextual information, including calendar data (e.g., appointments, appointment attendees), GPS data (e.g., set destination), task list data (e.g., to-do lists), email data (e.g., plans made with others), browsing history (e.g., shopping on a retailer website), call or messaging history, and many more.

BRIEF DESCRIPTION OF THE DRAWINGS

Aspects of the present disclosure are described in detail below with reference to the attached drawing figures, wherein.

DETAILED DESCRIPTION

Figure 1A:
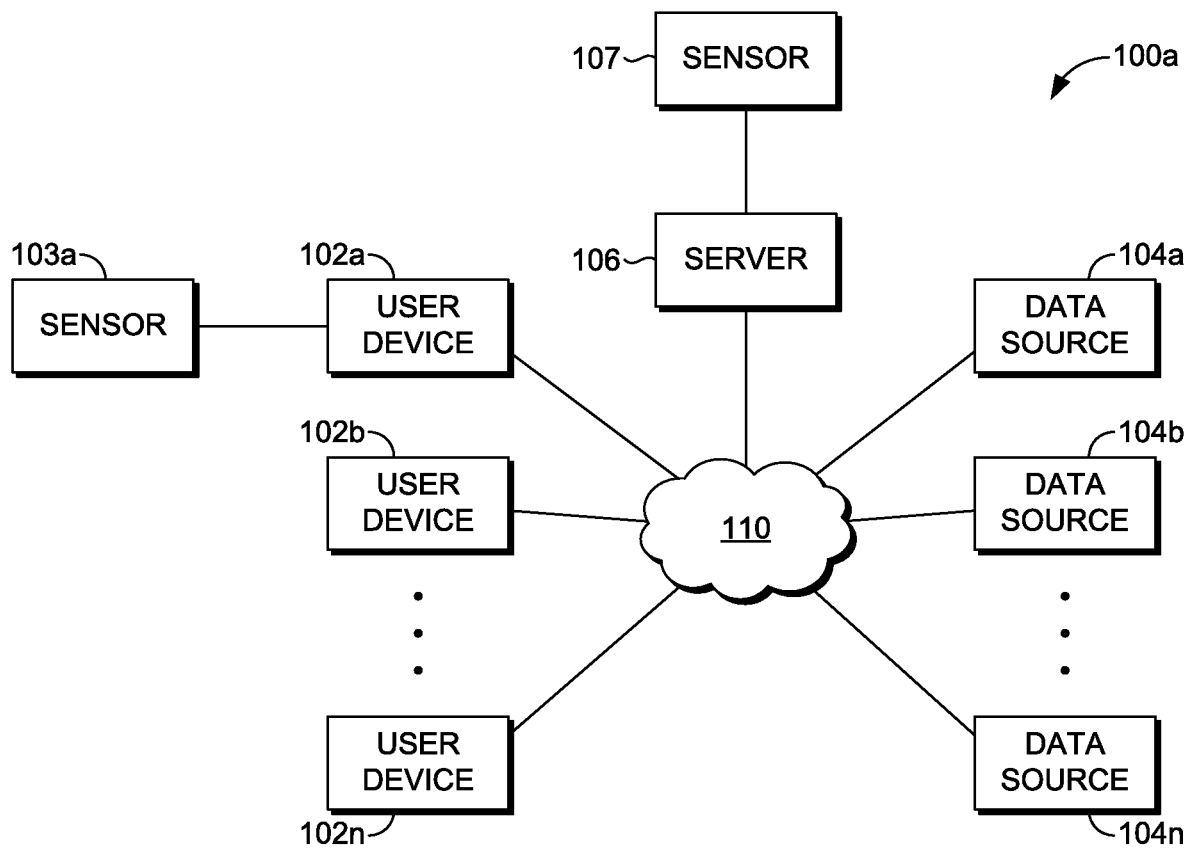
FIGS. 1A-1B are block diagrams of an example operating environment suitable for implementing aspects of the present disclosure.

The subject matter of aspects of the present disclosure is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

A variety of computing software has been developed to provide users with notifications or alerts based on their detected location. The software can have many different applications, such as alerting a user about specials, coupons, discounts, deals, location history, or general location information, just to name a few. Typically, the software is designed to utilize sensors of a user's computing device, such as a wireless network module of a user's mobile phone, to detect a recognized signal that is associated with a particular location. When the recognized signal is detected, the software can then infer that the user is located at the particular location, and subsequently provide the user with the programmed notification. The potential of this software can be great, as users could really benefit from instantaneously provided and generally difficult-to-find information for their intended visit to the particular location. However, current implementations of this software have left many annoyed or inconvenienced from false alarms and undesired notifications.

As noted, modern computing devices can sense and collect a wide variety of data about a user. This user-specific data may include the user's actions, whereabouts, interests, habits, preferences, relationships, vernacular, and the like. In order to improve the user experience, particularly across one or more computing devices associated with the user, user-specific data is typically stored on a cloud-based server, ideally to be accessed and utilized by all computing devices associated with the user or a user account associated with the user. For instance, cloud-based personalization-related (e.g., "personal assistant") applications can be configured to interpret user-specific data to facilitate a personalized experience. More specifically, these applications can employ this user-specific data to tailor the personalization-related application to the user. By way of example only, user data such as location history, shopping history, browsing history, media purchases, media consumed, calendar and/or appointment information, appointment attendees, and the like, can all be collected and retained in a user profile of a user account. This user data can then be analyzed to determine additional contextual data about the user, including user preferences, friends and/or co-workers, favorite venues or places, hobbies, and daily routine and/or habits, among many other things.

In this regard, as information about one or more visits to a particular location is collected and stored, it would be desirable to harness this information to determine whether a user has a specific intent to visit the particular location for an extended period of time, or is simply passing by or through the particular location towards another, different location. As such, aspects of the technology described herein are directed towards determining that a detected location visit at a particular location is or will be an extended visit. More particularly, embodiments can analyze location history data that corresponds to a place of interest, from one or more user accounts, to generate conditions for determining whether a detected location visit at the place of interest is or will be an extended visit or a short visit. In this way, false alarms and undesirable notifications can be minimized for users merely making short visits (e.g., simply passing by or through the particular location).

Turning now to FIG. 1A, a block diagram is provided showing an example operating environment 100a in which some embodiments of the present disclosure may be employed. It should be understood that this and other arrangements described herein are set forth only as examples. Other arrangements and elements (e.g., machines, interfaces, functions, orders, and groupings of functions) can be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, some functions may be carried out by a processor executing instructions stored in memory.

Among other components not shown, example operating environment 100*a* includes one or more user devices, such as user devices 102*a* and 102*b* through 102*n*; one or more data sources, such as data sources 104*a* and 104*b* through 104*n*; server 106; and network 110. It should be understood that environment 100*a* shown in FIG. 1 is an example of one suitable operating environment. Each of the components shown in FIG. 1 may be implemented via any type of computing device, such as computing device 500 described in connection to FIG. 5, for example. These components may communicate with each other via network 110, which may include, without limitation, one or more local area networks (LANs) and/or wide area networks (WANs). In exemplary implementations, network 110 comprises the Internet and/or a cellular network, amongst any of a variety of possible public and/or private networks.

It should be understood that any number of user devices, servers, and data sources may be employed within operating environment 100*a* within the scope of the present disclosure. Each may comprise a single device or multiple devices cooperating in a distributed environment. For instance, server 106 may be provided via multiple devices arranged in a distributed environment that collectively provide the functionality described herein. Additionally, other components not shown may also be included within the distributed environment.

User devices 102*a* and 102*b* through 102*n* can be client devices on the client-side of operating environment 100*a*, while server 106 can be on the server-side of operating environment 100*a*. Server 106 can comprise server-side software designed to work in conjunction with client-side software on user devices 102*a* and 102*b* through 102*n* so as to implement any combination of the features and functionalities discussed in the present disclosure. This division of operating environment 100*a* is provided to illustrate one example of a suitable environment, and there is no requirement for each implementation that any combination of server 106 and user devices 102*a* and 102*b* through 102*n* remain as separate entities.

User devices 102*a* and 102*b* through 102*n* may comprise any type of computing device capable of use by a user. For example, in one embodiment, user devices 102*a* through 102*n* may be the type of computing device described in relation to FIG. 5 herein. By way of example and not limitation, a user device may be embodied as a personal computer (PC), a laptop computer, a cellular or mobile device, a smartphone, a tablet computer, a smart watch, a wearable computer, a personal digital assistant (PDA), an MP3 player, a global positioning system (GPS) or device, a video player, a handheld communications device, a gaming device or system, an entertainment system, a vehicle computer system, an embedded system controller, a remote control, an appliance, a consumer electronic device, a workstation, or any combination of these delineated devices, or any other suitable device.

Data sources 104*a* and 104*b* through 104*n* may comprise data sources and/or data systems, which are configured to make data available to any of the various constituents of operating environment 100*a*, or system 200 described in connection to FIG. 2. For example, in one embodiment, one or more data sources 104*a* through 104*n* provide (or make available for accessing) user data for storage in data store 230 of FIG. 2, in association with a user profile 234 of FIG. 2. Data sources 104*a* and 104*b* through 104*n* may be discrete from user devices 102*a* and 102*b* through 102*n* and server 106 or may be incorporated and/or integrated into at least one of those components. In one embodiment, one or more of data sources 104*a* through 104*n* comprise one or more sensors, which may be integrated into or associated with one or more of the user device(s) 102*a*, 102*b*, or 102*n* or server 106. Examples of sensed user data made available by data sources 104*a* through 104*n* are described further in connection to data receiving component 220 of FIG. 2.

Figure 2:
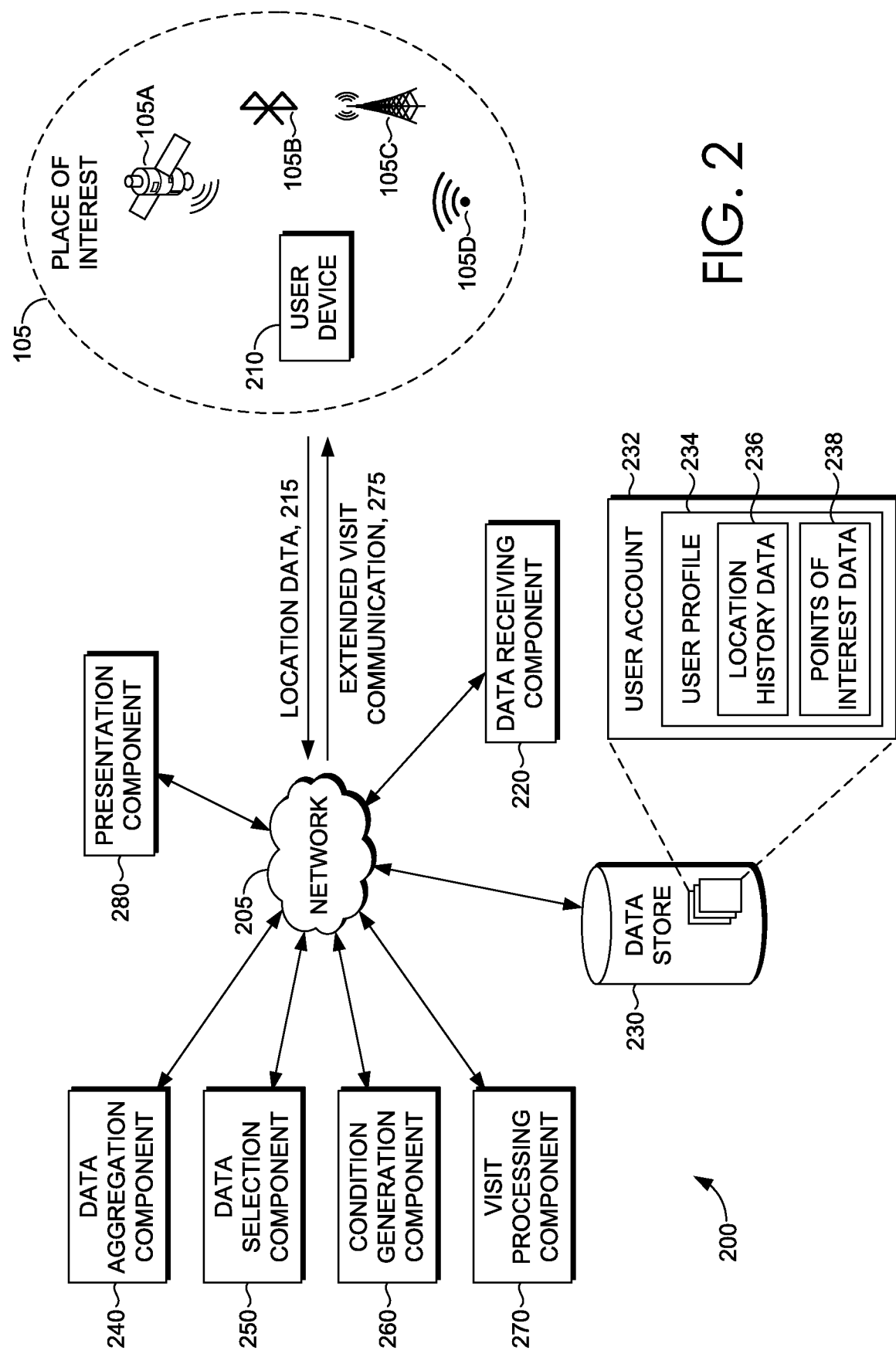
FIG. 2 is a diagram depicting an example computing architecture suitable for implementing aspects of the present disclosure.

Operating environment 100*a* can be utilized to implement one or more of the components of system 200, described in FIG. 2, including components for collecting and/or obtaining user data, aggregating user data, analyzing user data, selecting user data, generating conditions, generating inferences, processing queries, and communicating and/or presenting notifications having content associated with a particular location to users via their user device(s).

Figure 1B:
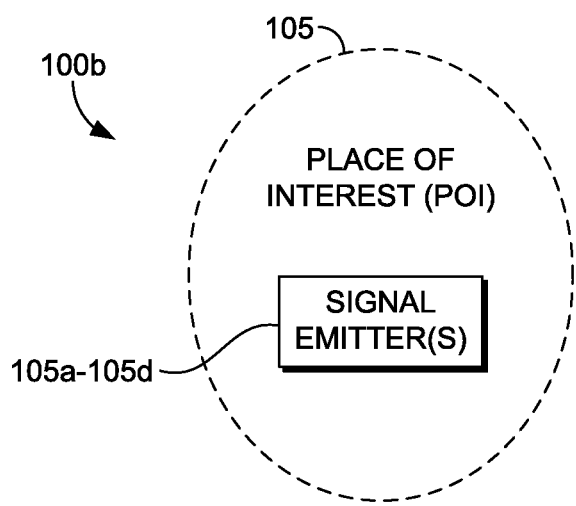

Looking now to FIG. 1B, a block diagram is provided showing an example place of interest 105 where some embodiments of the present disclosure may be configured to detect the extended or brief presence of a user device, and is designated generally as system 100*b*. Some embodiments of the present disclosure can detect the presence of a user device at a place of interest 105, and can then transmit an extended visit communication (e.g., a notification or alert) to the user device based on a determination that the user associated with the user device is making an extended visit to the place of interest 105. Place of interest 105 represents only one exemplary configuration of a detectable location. Other arrangements and elements can be used in addition to or instead of those shown, and some elements may be omitted altogether for the sake of clarity. Further, as with operating environment 100*a*, many of the elements described herein are functional entities that may be implemented as discrete or distributed components or in conjunction with other components, and in any suitable combination and location.

The example place of interest 105 can be any geographic locus where a user device positioned at or near the locus can detect, utilizing one or more sensors, signals provided by one or more signal emitters 105*a*-105*d* typically associated with the locus. That is, any signal that is readily and typically available for detection by a computing device's sensors, when the computing device is located at a particular location, can be a place of interest. In some embodiments described herein, the place of interest can be any geographic locus, as defined hereinabove, that a particular user account can have contextual links to. These contextual links can be determined from any set of user data that virtually "ties" the user to the particular location for a particular reason. Contextual links can be based on user profiles, or results of user data analyses, that identify a history of frequent visits to the locus (e.g., a dynamically defined "favorite" location or "user hub"), a user-defined interest to the locus (e.g., a manually defined "favorite" location or "user hub"), calendar information identifying the locus, appointment information identifying the locus, friends who are associated with or similarly located at the locus, an identified necessity to visit the locus (e.g., a grocery store list, a repair shop, a to-do list), or any other contextual link to the geographic locus, which can be identified from user data associated with a user account.

As described, the place of interest 105 can include or be near one or more signal emitters 105*a*-105*d* that can present, transmit, display, or otherwise communicate a signal that can be detected by a computing device that is at or substantially near the place of interest 105. In accordance with embodiments described herein, signals can include Wi-Fi signals, Bluetooth signals, cell tower signals, geocaching data, GPS data, nearby computing device signals, audible signals, patterned light emissions, wireless signals, detectable electronic or analog signals, readable identifier data (e.g., NFC, RFID, QR codes), and/or any other readable information. It is contemplated that any of the listed signals can be detected or read by a user's computing device if located within a detection range.

In embodiments, other variables related to the detection of a signal, such as a time that the signal was detected by the computing device, the signal type (e.g., 802.11, Bluetooth, NFC), signal strength and/or quality, and other like characteristics corresponding to the detected signal, can also be detected and stored with the detected signals. These variables can be utilized to determine the accuracy of the detected data and/or proximity of the user device to the place of interest 105.

Referring now to FIG. 2, with FIG. 1A, a block diagram is provided showing aspects of an example computing system architecture suitable for implementing an embodiment of the present disclosure, and is designated generally as system 200. System 200 represents only one example of a suitable computing system architecture. Other arrangements and elements can be used in addition to or instead of those shown, and some elements may be omitted altogether for the sake of clarity. Further, as with operating environment 100a, many of the elements described herein are functional entities that may be implemented as discrete or distributed components or in conjunction with other components, and in any suitable combination and location.

Example system 200 includes network 205, which is described in connection to network 110 of FIG. 1A, and which communicatively couple components of system 200 including data receiving component 220, data store 230, data aggregation component 240, data selection component 250, condition generation component 260, visit processing component 270, and presentation component 280. In some embodiments, the data receiving component 220, data store 230, data aggregation component 240, data selection component 250, condition generation component 260, visit processing component 270, and presentation component 280 may be embodied as a set of compiled computer instructions or functions, program modules, computer software services, or an arrangement of processes carried out on one or more computer systems, such as computing device 500 described in connection to FIG. 5, for example.

In one embodiment, the functions performed by components of system 200 can be associated with one or more personalization-related (e.g., "personal assistant") applications, services, or routines. In particular, such applications, services, or routines may operate on one or more user devices (such as user device 102a), servers (such as server 106), may be distributed across one or more user devices and servers, or be implemented in the cloud. Moreover, in some embodiments, these components of system 200 may be distributed across a network, including one or more servers (such as server 106) and client devices (such as user device 102a), in the cloud, or may reside on a user device, such as user device 102a. Moreover, these components, functions performed by these components, or services carried out by these components may be implemented at appropriate abstraction layer(s), such as the operating system layer, application layer, hardware layer, of the computing system (s). Alternatively, or in addition, the functionality of these components and/or the embodiments described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs) Additionally, although functionality is described herein with regards to specific components shown in example system 200, it is contemplated that in some embodiments functionality of these components can be shared or distributed across other components.

Continuing with FIG. 2, data receiving component 220 is generally responsible for accessing and/or receiving (and in some cases, identifying) user data from one or more data sources, such as data sources 104a and 104b through 104n of FIG. 1. In some embodiments, data receiving component 220 may be employed to facilitate the accumulation of user data associated with one or more users (including crowd-sourced data) for, among other things, data aggregation component 240. The data may be received (or retrieved), from user device(s) 210, by data receiving component 220, and optionally accumulated, reformatted, and/or combined by data receiving component 220, then stored in one or more data stores such as data store 230, where it may be accessed by other components of the system 200. For example, the user data may be stored in or associated with a corresponding user profile 234 associated with a corresponding user account 232, as will be described.

Among other things, location data 215 can be received by data receiving component 220, from one or more user device(s) 210. In accordance with embodiments described herein, the user device(s) 210 can be configured to communicate location data 215 to the data receiving component 220, as described herein. In embodiments, the user device(s) 210, also referenced herein as user device 102a of FIG. 1, can include one or more sensors that can detect signals that are typically associated with a particular geographic locus. It is further contemplated that the user device(s) 210 can include detected signal characteristics (e.g., signal type, strength, quality, bandwidth) in the location data 215. By way of example only, a user device 210 may include a GPS module for detecting GPS signals 105A and/or coordinates associated with the locus, Bluetooth signals 105B typically transmitted at or near the locus, cellular signals 105C being transmitted at or near the locus, Wi-Fi signals 105D typically transmitted at or near the locus, among many other types of signals described herein. In a further example, the signal characteristics of any of these detected signals can also be detected by the user device(s) 210.

In accordance with some embodiments described herein, the data store 230 can include one or more data stores, such as a database. The data store 230 can store and provide in response to a request, any set of user data associated with one or more user accounts, such as user account 232. The user account 232 can be any unique identifier that is associated with a user and one or more user device(s) associated with the user. For instance, an email address, employee number, phone number, or any other unique ID can correspond to each user account 232. The user profile 234 of a user account 232 can include location history data 236 and points of interest data 238, among other things.

Location history data 236 can include a plurality of pieces of location data that were received from any number of user devices 210, also referenced herein as user device 102a. In embodiments, location history data 236 can include any type of data that can be associated with a particular geographic locus, also referred to herein as a point of interest. For instance, location history data 236 can include references to signals and/or characteristics thereof, that were detected by a user device 210 associated with user account 232 when the user device 210 was located at the particular geographic locus. In other words, the location history data keeps a log of signals and/or signal characteristics detected at any particular location. As described, each piece of location history data can also include or reference temporal data, such as a time stamp when the signal was detected, and/or other characteristics associated with the detected signal (e.g., signal type, quality).

Each piece of location history data can also be referenced by points of interest data 238. The points of interest data 238 associated with a user account 232 can include any type of data that can semantically reference the particular geographic locus. In other words, each user account 232 can include dynamically defined and/or user-defined semantic references to a particular geographic locus. In some embodiments, these locations can be referred to as "user hubs." By way of example, if a user arrives at an office building every weekday, and remains there from 9 AM to 5 PM, the system may employ logic to dynamically define the office building, its address, GPS coordinates, and/or the like, to be defined as "Work." On the other hand, if the user arrives and remains at a house every evening, the system may employ similar logic to dynamically define the house, its address, GPS coordinates, and/or the like, to be defined as "Home." Other methods may be employed to allow the user to manually define the semantic reference to the particular location. As each piece of the points of interest data can reference a piece of location history data, or vice versa, various visits to a particular geographic locus can be labeled with the defined semantic reference.

In some embodiments, the user profile 234 can also include contextual information (not shown) associated with the user. As described herein, contextual information can include any information about the user obtained by, for instance, data receiving component 220. In some embodiments, the contextual information can enable components of the system 200 (e.g., condition generating component) to determine and/or generate inferences about the user, including but not limited to: user preferences, friends and/or co-workers, favorite venues or places, hobbies, daily routine and/or habits, likely destinations, and actions likely to be taken, among many other things.

The location and contextual information associated with a user may be received as user data from a variety of sources, and the data may be available in a variety of formats. For example, in some embodiments, user data received via data receiving component 220 may be determined via one or more sensors (such as sensors 103a and 107), which may be on or associated with one or more user devices (such as user device 102a), servers (such as server 106), and/or other computing devices. As used herein, a sensor may include a function, routine, component, or combination thereof for sensing, detecting, or otherwise obtaining information such as user data from a data source 104a, and may be embodied as hardware, software, or both.

By way of example and not limitation, user data may include data that is sensed or determined from one or more sensors (referred to herein as sensor data). In some aspects, user data can include location information of mobile device (s), smartphone data (such as phone state, charging data, date/time, or other information derived from a smartphone), and user-activity information (e.g., app usage, online activity, searches, voice data such as automatic speech recognition, activity logs, communications data including calls, texts, instant messages, and emails, website posts, other user data associated with communication events). In some aspects, user data can include: user activity that occurs via more than one user device, user history, session logs, application data, contacts data, calendar and schedule data, notification data, social network data, news (including popular or trending items on search engines or social networks), online gaming data, ecommerce activity (including data from online accounts such as Microsoft®, Amazon.com®, Google®, eBay®, PayPal®, video-streaming services, gaming services, or Xbox® Live®), user-account(s) data (which may include data from user preferences or settings associated with a personalization-related (e.g., "personal assistant") application or service), home-sensor data, appliance data, global positioning system (GPS) data, vehicle signal data, traffic data, weather data (including forecasts), wearable device data, other user device data (which may include device settings, profiles, network connections such as Wi-Fi network data, or configuration data, data regarding the model number, firmware, or equipment, device pairings, such as where a user has a mobile phone paired with a Bluetooth headset, for example), gyroscope data, accelerometer data, payment or credit card usage data (which may include information from a user's PayPal® account), purchase history data (such as information from a user's Amazon.com® or eBay® account), other sensor data that may be sensed or otherwise detected by a sensor (or other detector) component including data derived from a sensor component associated with the user (including location, motion, orientation, position, user-access, user-activity, network-access, user-device-charging, or other data that is capable of being provided by one or more sensor component), data derived based on other data (for example, location data that can be derived from Wi-Fi, cellular network, or IP address data), and nearly any other source of data that may be sensed or determined as described herein.

User data may be obtained in user-data streams or "user signals," which can be a feed or stream of user data from a data source. For instance, a user signal can be from another smartphone, a home-sensor device, a GPS device (e.g., for location coordinates), a vehicle-sensor device, a wearable device, a user device, a gyroscope sensor, an accelerometer sensor, a calendar service, an email account, a credit card account, or other data sources. In some embodiments, data receiving component 220 receives or accesses data continuously, periodically, or as needed.

User data, particularly in the form of contextual information and/or location data, can be received by data receiving component 220 from one or more sensors and/or computing devices associated with a user. While it is contemplated that the user data is processed by the sensors or other components not shown, for interpretability by data receiving component 220, embodiments described herein do not limit the user data to processed data and may include raw data. Contextual information and location data may be received on a higher level, for instance, from individual applications, or on a lower level, for instance, from operating systems. Operating systems such as Microsoft® Windows®, Apple® iOS®, Google® Android®, may be operable to collect contextual information and associate the contextual information with the user. Typically, operating systems can be configured to associate with a user account. In the alternative, applications running on operating systems may independently associate with the user account, or may inherit associations with the user account through the operating system on which it resides. The contextual information can be accessed by data receiving component 220, configured to interface with the application(s) or operating system(s), among other things, to request and/or receive the user's contextual information or location data therefrom. In some embodiments, data receiving component 220 can operate independently within the user's computing device(s) to receive the user data.

In some embodiments, data receiving component 220 and/or one or more other components or subcomponents of system 200, such as data selection component 250 or condition generation component 260, may determine interpretive data from received user data. Interpretive data can correspond to portions of data analyzed by these components or subcomponents to interpret user data. For example, interpretive data can be utilized to provide context to user data, which can support determinations or inferences made by the components or subcomponents. Moreover, it is contemplated that some embodiments may utilize user data in combination with interpretive data for carrying out the objectives of the components and subcomponents described herein.

Among other things, and in accordance with some embodiments, the data aggregation component 240 can obtain the pieces of user data (e.g., location history data) that are associated with a particular user account from the data store 230. The relevant pieces can be obtained in response to a communicated query, to the data store 230, that requests all pieces of location history data that corresponds to one or more places of interest. In another instance, the data aggregation component 240 can obtain, among other things, the pieces of user data that are associated with a particular user's place(s) of interest or a plurality of users' place(s) of interest. As noted, temporal data and signal information associated with a place of interest can be included in the obtained user data. In accordance with some embodiments described herein, the obtained user data can also include contextual information associated with the one or more user accounts. It is contemplated that the system 200 can also employ the data aggregation component 240 for obtaining relevant contextual information (e.g., as user data) corresponding to a user account and/or place(s) of interest.

The data aggregation component 240 can communicate the obtained pieces of user data to data selection component 250. In some embodiments, the data selection component 250 can analyze the obtained pieces of user data to identify those pieces that represent one or more short visits at the identified place of interest. In embodiments, the obtained pieces of user data will be associated with one or more users, and further associated with one or more places of interest. Each user account associated with the obtained user data can include location history data that corresponds to a particular place of interest. The data selection component 250 can analyze the corresponding signal information and temporal data (and contextual information, in accordance with some embodiments) to identify sets of the obtained pieces of user data that represent short visits at one or more places of interest. In further embodiments, the data selection component 250 can also distinguish the pieces of user data that represent short visits versus extended visits.

By way of example only, the data selection component 250 can analyze the obtained pieces of user data associated with a particular user account, to identify a first piece of location history data that indicates when signals associated with a particular place of interest were first detected by an associated user device within a defined period (e.g., a twenty-four-hour period). The data selection component 250 can then identify one or more subsequent piece(s) of location history data that indicate when substantially the same signals associated with the particular place of interest are next detected by the associated user device.

In one aspect, if immediate subsequently-recorded piece(s) of location history data indicate that those signals are once again detected, then an inference can be made that the user device is still at the particular place of interest. In some instances, a default threshold (e.g., ten minutes, half-hour, one hour) can be used for comparison against a calculated duration starting from a time of the first detected set of signals, and ending at a time of a last detected set of the substantially similar signals before the signals are no longer detected by the user device. In this way, if the data selection component 250 calculates a duration that is greater than the default threshold, then an inference can be made that the detected visit by the user was an extended visit. Conversely, when the duration is calculated to be less than the default threshold, an inference can be made that the detected visit was short visit. In this regard, the pieces of user data associated with determined short visits are identified, and a duration of each short (e.g., pass-through) visit can be calculated for subsequent processing by condition generation component 260.

In another aspect, characteristics of the detected signals can also be considered by the data selection component 250 in its analysis. For instance, detected signals that increase in strength or quality over time, may indicate that a user device is approaching a particular place of interest. On the other hand, detected signals that decrease in strength or quality over time may conversely indicate that the user device is departing the particular place of interest. The signal information may be utilized to further fine-tune the duration of short and/or extended visits, in accordance with some embodiments described herein.

In some further embodiments, the data selection component 250 can identify one or more temporal patterns in obtained pieces of user data associated with one or more user account(s). For instance, in some embodiments the data selection component 250 can determine that obtained pieces of user data within one timeframe (e.g., certain hours of the day, days of week, weekend, weekday, month, season) have different visit characteristics (e.g., visit durations, detected signals) than another different timeframe. In this regard, the data selection component 250 can segregate the obtained pieces of user data within these identified timeframes for communication to the condition generation component 260, such that the condition generation component 260 can generate conditions for each corresponding timeframe.

The condition generation component 260 can receive the pieces of user data that were identified by the data selection component 250 as being associated with determined short visits at the particular place of interest. In some instances, the duration of each determined short visit can also be received in association with corresponding pieces of the user data. In accordance with embodiments described herein, the condition generation component 260 can utilize the received data to generate conditions or rules for determining when future detected location visits at the particular place of interest are extended (or conversely, short). As noted above, the condition generation component 260 can also associate specific timeframe conditions to generate conditions for determining when future detected location visits at the particular place of interest are extended visits or short visits by associating the identified timeframes to the generated conditions.

It is contemplated that any known statistical methodology for determining a best set of conditions based on previous data points can be employed to generate conditions for determining when future detected location visits at the particular place of interest are extended (or conversely, short). By way of example only, a calculated mean, median, mode, or range of the calculated durations for each determined short visit can be processed to define a temporal condition associated with the particular place of interest. In this regard, any future detected visits that include location data indicating an excess of this temporal condition can meet at least the temporal condition that is required to determine that the detected location visit is an extended visit. In some embodiments, the temporal condition can be employed as a timer that the system 200, or more specifically visit processing component 270, can ping or request updated location data 215 from a user device to determine whether all conditions are still met. In other embodiments, the temporal condition is merely a threshold to determine durations derived from received location data 215.

In some aspects, certain detected signals and/or characteristics thereof, for each detected visit, can be processed to define signal conditions for determining when future detected location visits at the particular place of interest are extended (or conversely, short). By way of example only, a number of signals, particular signal identifiers (e.g., host names, IP addresses, network names, access point identifiers, MAC addresses), particular signal types (e.g., Wi-Fi, Bluetooth, cellular, GPS), particular signal characteristics (e.g., strength, quality, signal-to-noise ratios), and other aspects that can be associated with detectable signals at the particular place of interest, can be processed to define signal condition(s) associated with the particular place of interest. In this way, any future detected visits that include location data referencing at least the signal condition(s) can meet at least the signal condition(s) required to determine that the detected location visit is an extended one.

In some embodiments, the condition generation component 260 can rank certain types of signals based on their signal type, or consistency of detection at a particular place of interest. In this regard, if certain detected signals are inconsistently present at a particular place of interest, the condition generation component 260 may determine not to include those signals in the signal conditions for the particular place of interest.

The visit processing component 270 can obtain and employ the condition(s) generated by condition generation component 260, to determine whether a detected location visit at a particular place of interest is extended (or conversely, short). In some embodiments, contextual information associated with the user account can be obtained from the data store 230, and considered by the data selection component 250 in its visit analysis. By way of example only, if a user's calendar data indicates that the user has an appointment at the particular place of interest, the appointment data may be useful contextual information that is considered by the visit processing component 270. A determination that the user intends to visit the particular place of interest for an extended period of time (e.g., beyond the threshold duration) may be instantly made upon the initial detection of the location visit, as opposed to after a delay based on the defined temporal condition.

By way of example only, assume user device 210 associated with user account 232 arrives at place of interest 105 (referred to as "venue" for purposes of this example), and the sensors associated with the user device 210 detect one or more signals typically associated with the venue. For instance, the user device 210 may detect a Wi-Fi signal 105D that is always provided to patrons of the venue, a Bluetooth signal that is oftentimes (but not always) transmitted from a smartphone of the venue owner, GPS coordinates or signals typically received from satellite 105A, and/or cellular transmissions typically transmitted from one or more nearby cell towers 105C. As user data associated with the venue may indicate, the Bluetooth signal can be inconsistently present at the venue. As such, the condition generation component 260 may not necessarily include the Bluetooth signal in the signal conditions associated with the venue.

Moving forward with the example, the new or currently detected location data 215 is received by the data receiving component 220, which can communicate the data 215 to data store 230 for storage in association with the user account 232. Concurrently, the visit processing component 270 can determine whether an inference can be made regarding the user's duration of the venue visit. The visit processing component 270 can query various components of system 200 to determine whether information for making the inference is available. For instance, the data store 230 can be queried to determine whether a substantive amount of user data is available for condition generation component 260 to generate a statistically significant set of conditions. In another instance, the visit processing component 270 can query the data store 230 and/or condition generation component 260 to determine whether any set(s) of conditions have been previously generated and stored in association with the venue. When visit processing component 270 makes the determination that generated conditions or substantial amounts of user data are available, such that a reliable inference to user visit duration can be made, it can initialize any of the processes described in association with any one or more components described herein to process the new location data.

In this non-limiting example, the visit processing component 270 determines that conditions have already been generated for the venue, and made available for access in data store 230. The conditions set for the venue may define that GPS coordinates must be within a five-hundred-foot radius of (47.642382, −122.137007), that a Wi-Fi signal should be associated with access point "Venue guest," and cell-tower data should originate from "cell tower ABC." The conditions may also define that the minimum duration before the system 200 requests updated location information from the user device 210 is four minutes (e.g., the average time it takes one to walk through the venue). That is, a determination was made by condition generation component 260 that four minutes is the average duration that should pass (after the first signal corresponding to the venue was received) before the user device 210 is pinged again for updated location data 215. The updated location data 215 can be compared, by visit processing component 270, against the generated condition(s) as a reliable bar for determining whether a detected visit to the venue is and extended visit or not. If the updated location data indicates that all required signals are still detected by the user device 210, then all conditions are met and the visit processing component 270 can make a strong inference that the location visit to the venue was an extended visit. On another note, if contextual information associated with the user account is obtained for analysis by the visit processing component 270, and the contextual information describes that the user has an appointment in fifteen minutes at another location on the opposite side of the venue, an inference can be made that the user is simply passing through the venue to make the appointment. In this regard, and in accordance with embodiments described herein, the contextual information can override or influence the determination made by the visit processing component 270.

To this end, the visit processing component 270 can then communicate its determination to presentation component 280 for delivery to the user device 210. In some embodiments, presentation component 280 can generate user interface features associated with an extended location visit determination. Such features can include interface elements (such as graphics, buttons, sliders, menus, audio prompts, alerts, alarms, vibrations, pop-up windows, notification-bar or status-bar items, in-app notifications, or other similar features for interfacing with a user), queries, and prompts. For example, presentation component 280 may communicate a notification or alert to the user device 210.

Some embodiments of presentation component 280 may receive extended location visit determinations and provide this information to the data store 230, for storage in relation to the user account. In some further embodiments, the extended location visit determination can be communicated to a personalization-related service or application (e.g., personal assistant application) operating in conjunction with presentation component 280, where the personalization-related service or application determines when and how to present the user with the determination notification via the user device 210. In such embodiments, the extended location visit determination may be understood as a recommendation to the presentation component 280 (and/or personalization-related service or application) for when and how to present a notification, which may be overridden by the personalization-related app or presentation component 280.

In some embodiments, the presentation component 280 can generate a user interface for display on the user device 210. The user interface can have a number of elements for providing content associated with an extended location visit determination notification, generated by presentation component 280, and referenced generally as the user interface (not shown). In some embodiments, the extended location visit determination notification generated by the presentation component 280 may be formatted in a markup language, tagged, or indexed to indicate how specific portions of the content are to be used by presentation component 280.

In further embodiments, the user interface may further include one or more extended location visit determination notifications based on previous determinations corresponding to a particular place of interest. As was described, the data store may include previous extended location visit determinations from one or more detected location visits meeting the extended location visit conditions. As described, the above example is merely exemplary and not intended to be limiting. It is contemplated that the extended location visit determination notifications may include information related to the particular place of interest of any type (e.g., advertisements, coupons, check-in requests), as described in the present disclosure.

Figure 3:
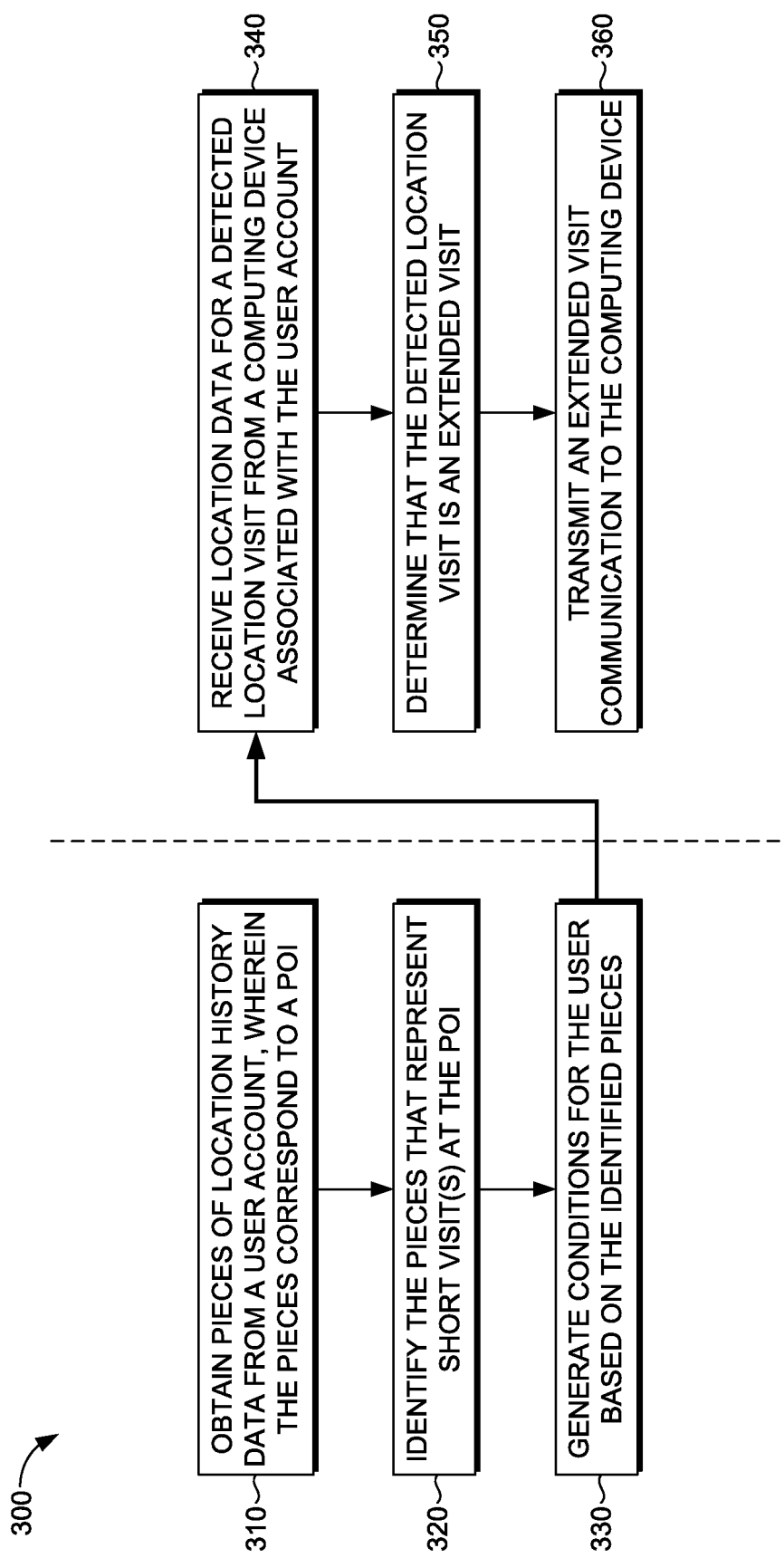
FIG. 3 depicts a flow diagram of a method for determining that a detected location visit at a place of interest is an extended visit.

Turning now to FIG. 3, a flow diagram is provided illustrating one example method 300 for determining that a location visit at an identified place of interest is an extended visit (or conversely, a short visit). The following method can be performed for any particular user account, for any particular point of interest, such that a user's location history data that can be associated with a venue can be analyzed to generate conditions in accordance with some embodiments of the present disclosure. That is, a personalized model can be generated, employing personalized data, to determine probabilities and/or conditions for determining an extended or short visit duration for the user at a particular place of interest.

Each block or step of method 300 and other methods described herein comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a stand-alone application, a service or hosted service (stand-alone or in combination with another hosted service), or a plug-in to another product, to name a few.

At step 310, pieces of location history data are obtained from a user account. The pieces obtained correspond to a particular place of interest. Each piece of location history data can reference one or more signals that were detected by any one or more of a plurality of computing devices that are associated with the user account. Further, each piece of location history can reference temporal data (e.g., time stamps) that correspond to a time that each signal was detected. Embodiments of step 310 may occur over an extended duration of time, such that a plurality of pieces of location history data is collected over time, with each piece of location data corresponding to a unique process (e.g., detection of location data) occurring on the user's one or more computing devices associated with a user account. Each piece of location data can be sensed or detected by a plurality of computing devices and/or sensors associated with a user.

At step 320, the pieces of location history data obtained in step 310 are analyzed to identify one or more pieces that represent a short visit (or conversely, an extended visit) at the identified place of interest. That is, temporal data referenced by the obtained pieces can be analyzed to determine the set of pieces that correspond to a particular location visit at the identified place of interest. These pieces can also be determined as being sequentially received, based on their temporal data. One or more sequentially ordered pieces of location history data can be aggregated together to calculate a duration of the location visit at the identified place of interest. In other words, the temporal data from the first and last pieces of location history data for a particular location visit can be used to calculate the corresponding visit duration. In embodiments, the duration for each location visit to the identified place of interest is identified.

At step 330, conditions for determining a user's visit status (e.g., extended or short) at the identified place of interest, when a location visit is detected, are generated based at least in part on the pieces of location history data identified in step 320. In embodiments, the conditions can include a signal condition and a temporal condition. The signal condition defines certain signals that must be substantially detected (e.g., seventy-five-percent to one-hundred-percent) at the identified place of interest, a minimum number of signals detected at the identified place of interest, and/or the strength or quality of the signals substantially detected at the identified place of interest. The temporal condition defines a minimum (or conversely, a maximum) duration that must pass before subsequent location data received from the computing device associated with the user account also substantially meets the signal condition. In this way, once the conditions associated with the identified place of interest are substantially met (e.g., the required signals are initially substantially detected upon the detected location visit, and again after the minimum duration), a strong inference can be made that the user is making an extended visit (or conversely, a short visit) to the identified place of interest, as opposed to simply passing by or through (or conversely, staying at) the identified place of interest.

In some further embodiments, contextual information associated with the user account of the visiting computing device can be obtained and analyzed to modify or define the conditions for determining the associated user's visit status. In accordance with some embodiments of the present disclosure, the time of day (e.g., specific times, mornings, afternoons, evenings), day of week, month, season, and the like, can cause the user's visit duration to be analyzed differently, such that the user's visit status is determined based on different conditions that were generated for these timeframes. In accordance with some other embodiments of the present disclosure, contextual information, including calendar data (e.g., appointments, appointment attendees), GPS data (e.g., set destination), task list data (e.g., to-do lists), email data (e.g., plans made with others), browsing history (e.g., shopping on a retailer website), call or messaging history, and many other categories of collectable user data associated with a user account can be utilized to can further cause the user's visit duration to be analyzed differently, such that the user's visit status is determined based on different conditions that were generated for these timeframes. It is contemplated that in some instances, the contextual information can cause a modification of the user's visit duration analysis, such as a minimal signal condition without a temporal condition, where the user's detected visit at the particular location is immediately determined as an extended (or conversely, short) visit based on a substantial detection of the minimal signal condition.

At step 340, location data from the computing device located at the identified place of interest can be received. The location data can reference at least a portion of the signals associated with the identified place of interest to make a determination that the location visit is at the identified place of interest. In some embodiments, signals that at least meet a substantial portion of the signal condition, defined in step 330, can be detected to determine that the location visit is at the identified place of interest.

At step 350, a determination can be made that the detected location visit at the identified place of interest is an extended visit (or conversely, a short visit) based at least in part on received location data that corresponds to the detected location visit, and on the conditions generated in step 330. As described in step 330, the received location data that corresponds to the detected location visit includes at least the signals initially detected upon the detected location visit, and again after the minimum duration defined in step 330. In accordance with embodiments described herein, the user device can be queried or pinged to request updated location data. Upon receiving the updated location data, a determination that the detected location visit is likely an extended visit (or conversely, a short visit) can then be made.

At step 360, a communication, such as a notification or alert, can be transmitted to the user device based on the determination made in step 350. That is, having a relatively high confidence, a notification or alert can be communicated to the user device within a relatively short time frame (e.g., instantaneously to around the threshold duration), so as to prevent false alerts or annoying notifications to the user.

Figure 4:
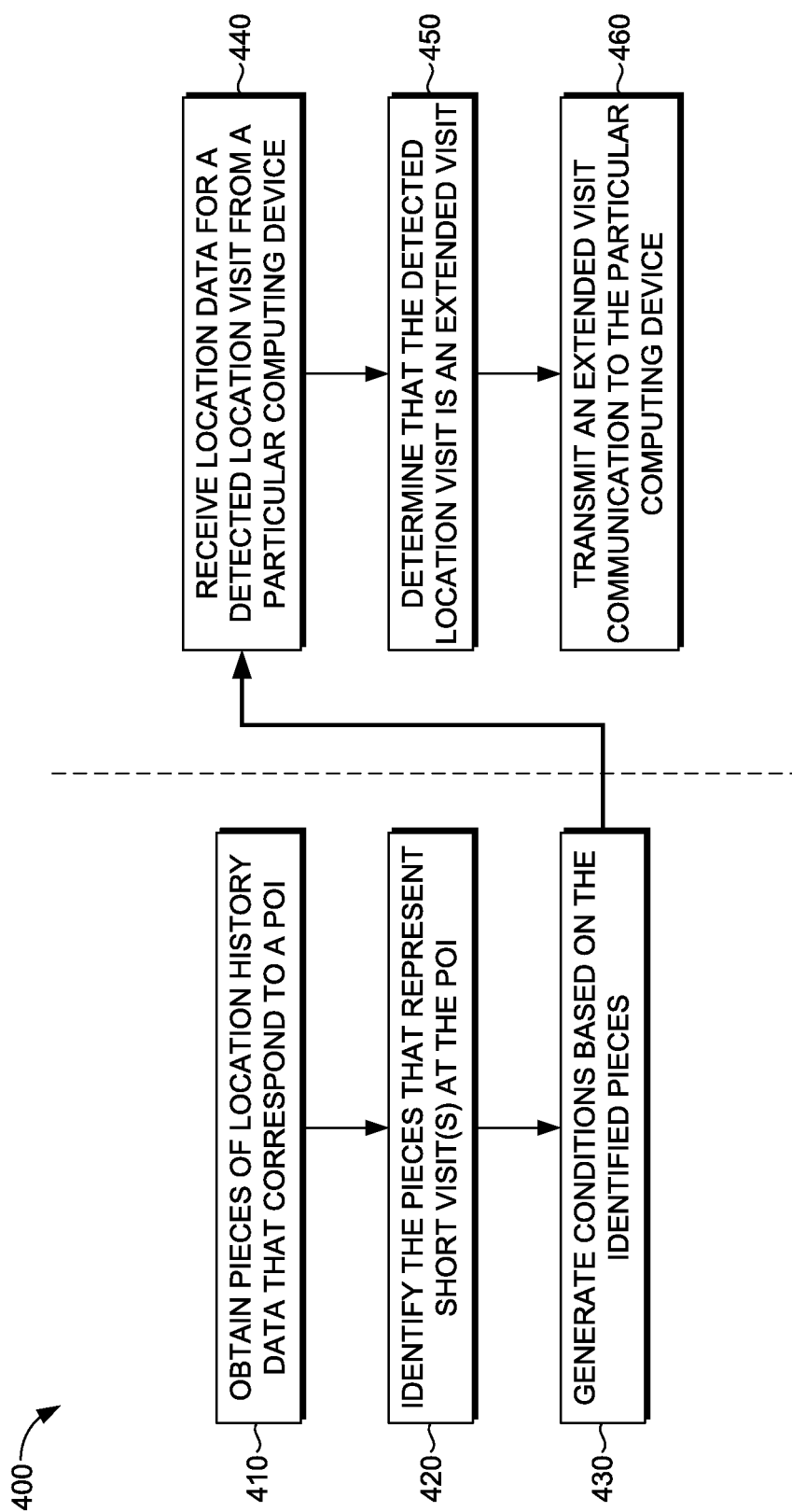
FIG. 4 depicts a flow diagram of another method for determining that a detected location visit at a place of interest is an extended visit.

With reference now to FIG. 4, a flow diagram is provided illustrating another example method 400 for determining that a location visit at an identified place of interest is an extended visit (or conversely, a short visit). The following method can be performed a number of times, for a plurality of points of interests, such that any number of venues that can be associated with one or more users' location history data can be analyzed to generate conditions in accordance with some embodiments of the present disclosure. That is, an aggregated model can be generated, employing non-personalized data, to determine probabilities and/or conditions for determining extended or short visit durations for any user to any place of interest.

Each block or step of method 400 and other methods described herein comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a stand-alone application, a service or hosted service (stand-alone or in combination with another hosted service), or a plug-in to another product, to name a few.

At step 410, pieces of location history data are obtained from a plurality of user accounts. The pieces obtained correspond to a particular place of interest. Each piece of location history data can reference one or more signals that were detected by any one or more of a plurality of computing devices that are associated with each user account. Further, each piece of location history data can reference temporal data (e.g., time stamps) that corresponds to a time that each signal was detected. Embodiments of step 410 may occur over an extended duration of time, such that the plurality of pieces of location history data is collected over time, with each piece of location history data corresponding to a unique process (e.g., detection of location history data) occurring on one of the plurality of user's one or more computing devices associated with their respective user account. Each piece of location history data can be sensed or detected by one or more of computing devices and/or sensors associated with a user and/or user account.

At step 420, the pieces of location history data obtained in step 410 are analyzed to identify one or more pieces that represent a short visit (or conversely, an extended visit) at the identified place of interest. That is, temporal data referenced by the obtained pieces can be analyzed to determine the set of pieces that correspond to a particular location visit at the identified place of interest. These pieces can also be determined as being sequentially received, based on their temporal data. One or more sequentially ordered pieces of location history data for each user can be aggregated together, to calculate the duration of the user's location visit at the identified place of interest. In other words, the temporal data from the first and last pieces of location history data for a particular location visit can be used to calculate each user's corresponding visit duration. In embodiments, the duration for each user's location visit to the identified place of interest is identified.

At step 430, conditions for determining any user's visit status (e.g., extended or short) at the identified place of interest, when a location visit is detected, are generated based at least in part on the pieces of location history data identified in step 420. In embodiments, the conditions can include a signal condition and a temporal condition. The signal condition defines certain signals that must be substantially detected (e.g., seventy-five-percent) by a visiting computing device (associated with the visiting user's account) at the identified place of interest, a minimum number of signals detected at the identified place of interest, and/or the strength or quality of the signals detected at the identified place of interest. The temporal condition defines a minimum (or conversely, a maximum) duration that must pass before subsequent location data received from the visiting computing device associated with the visiting user's account also meets the signal condition. In this way, once the conditions associated with the identified place of interest are met (e.g., the required signals are initially detected upon the detected location visit, and again after the minimum duration), a strong inference can be made that the visiting user is making an extended visit (or conversely, a short visit) to the identified place of interest, as opposed to simply passing by or through (or conversely, staying at) the identified place of interest.

In some further embodiments, contextual information associated with the user account of the visiting computing device can be obtained and analyzed to modify or define the conditions for determining the associated user's visit status. In accordance with some embodiments of the present disclosure, the time of day (e.g., specific times, mornings, afternoons, evenings), day of week, month, season, and the like, can cause the user's visit duration to be analyzed differently, such that the user's visit status is determined based on different conditions that were generated for these timeframes. In accordance with some other embodiments of the present disclosure, contextual information, including calendar data (e.g., appointments, appointment attendees), GPS data (e.g., set destination), task list data (e.g., to-do lists), email data (e.g., plans made with others), browsing history (e.g., shopping on a retailer website), call or messaging history, and many other categories of collectable user data associated with a user account can be utilized to can further cause the user's visit duration to be analyzed differently, such that the user's visit status is determined based on different conditions that were generated for these timeframes. It is contemplated that in some instances, the contextual information can cause a modification of the user's visit duration analysis, such as a minimal signal condition without a temporal condition, where the user's detected visit at the particular location is immediately determined as an extended (or conversely, short) visit based on a substantial detection of the minimal signal condition.

At step 440, location data from the visiting user's computing device located at the identified place of interest can be received. The location data can reference at least a portion of the signals associated with the identified place of interest, to make a determination that the detected location visit is at the identified place of interest. In some embodiments, detected signals that meet at least a substantial portion of the signal condition, defined in step 430, are detected to determine that the detected location visit is at the identified place of interest.

At step 450, a determination can be made that the detected location visit at the identified place of interest is an extended visit (or conversely, a short visit) based at least in part on received location data that corresponds to the detected location visit, and on the conditions generated in step 430. As described in step 430, the received location data that corresponds to the detected location visit includes at least substantially (e.g., ninety-percent) the signals initially detected upon the detected location visit, and again after the minimum duration defined in step 430. In accordance with embodiments described herein, the visiting user device can be queried or pinged to request updated location data. Upon receiving the updated location data, a determination that the detected location visit is likely an extended visit (or conversely, a short visit) can then be made.

At step 460, a communication, such as a notification or alert, can be transmitted to the visiting computing device based on the determination made in step 450. That is, having a relatively high confidence, a notification or alert can be communicated to the visiting computing device within a relatively short time frame (e.g., instantaneously to around the threshold duration), so as to prevent false alerts or annoying notifications to the user.

Accordingly, various aspects of technology for determining that a location visit at an identified place of interest is extended is described. It is understood that various features, sub-combinations, and modifications of the embodiments described herein are of utility and may be employed in other embodiments without reference to other features or sub-combinations. Moreover, the order and sequences of steps shown in the example methods 300 and 400 are not meant to limit the scope of the present invention in any way, and in fact, the steps may occur in a variety of different sequences within embodiments hereof. Such variations and combinations thereof are also contemplated to be within the scope of embodiments of the invention.

Figure 5:
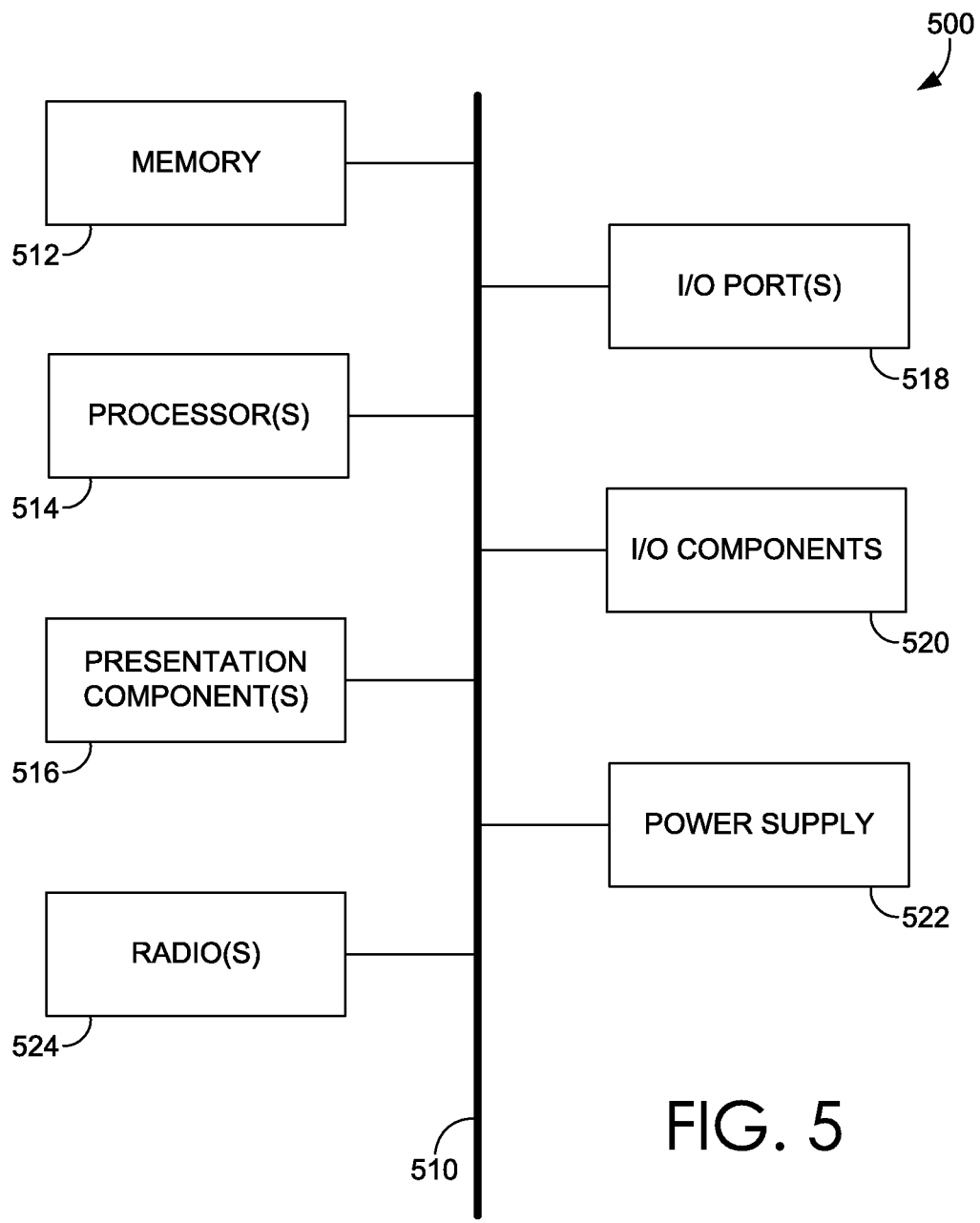
FIG. 5 is a block diagram of an exemplary computing environment suitable for use in implementing an embodiment of the present disclosure.

Having described various embodiments of the invention, an exemplary computing environment suitable for implementing embodiments of the invention is now described. With reference to FIG. 5, an exemplary computing device is provided and referred to generally as computing device 500. The computing device 500 is but one example of a suitable computing environment and is not intended to suggest any limitation as to the scope of use or functionality of the invention. Neither should the computing device 500 be interpreted as having any dependency or requirement relating to any one or combination of components illustrated.

Embodiments of the invention may be described in the general context of computer code or machine-useable instructions, including computer-useable or computer-executable instructions, such as program modules, being executed by a computer or other machine, such as a personal data assistant, a smartphone, a tablet PC, or other handheld device. Generally, program modules, including routines, programs, objects, components, data structures, and the like, refer to code that performs particular tasks or implements particular abstract data types. Embodiments of the invention may be practiced in a variety of system configurations, including handheld devices, consumer electronics, general-purpose computers, more specialty computing devices. Embodiments of the invention may also be practiced in distributed computing environments where tasks are performed by remote-processing devices that are linked through a communications network. In a distributed computing environment, program modules may be located in both local and remote computer storage media including memory storage devices.

With reference to FIG. 5, computing device 500 includes a bus 510 that directly or indirectly couples the following devices: memory 512, one or more processors 514, one or more presentation components 516, one or more input/output (I/O) ports 518, one or more I/O components 520, and an illustrative power supply 522. Bus 510 represents what may be one or more busses (such as an address bus, data bus, or combination thereof). Although the various blocks of FIG. 5 are shown with lines for the sake of clarity, in reality, these blocks represent logical, not necessarily actual, components. For example, one may consider a presentation component such as a display device to be an I/O component. Also, processors have memory. The inventors hereof recognize that such is the nature of the art and reiterate that the diagram of FIG. 5 is merely illustrative of an exemplary computing device that can be used in connection with one or more embodiments of the present invention. Distinction is not made between such categories as "workstation," "server," "laptop," "handheld device," as all are contemplated within the scope of FIG. 5 and with reference to "computing device."

Computing device 500 typically includes a variety of computer-readable media. Computer-readable media can be any available media that can be accessed by computing device 500 and includes both volatile and nonvolatile, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVDs) or other optical disk storage, magnetic cassettes, magnetic tape, magnetic disk storage or other magnetic storage devices, or any other medium which can be used to store the desired information and which can be accessed by computing device 500. Computer storage media does not comprise signals per se. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media, such as acoustic, RF, infrared, and other wireless media. Combinations of any of the above should also be included within the scope of computer-readable media.

Memory 512 includes computer storage media in the form of volatile and/or nonvolatile memory. The memory may be removable, non-removable, or a combination thereof. Exemplary hardware devices include solid-state memory, hard drives, optical-disc drives. Computing device 500 includes one or more processors 514 that read data from various entities such as memory 512 or I/O components 520. Presentation component(s) 516 presents data indications to a user or other device. Exemplary presentation components include a display device, speaker, printing component, vibrating component, and the like.

The I/O ports 518 allow computing device 500 to be logically coupled to other devices, including I/O components 520, some of which may be built in. Illustrative components include a microphone, joystick, game pad, satellite dish, scanner, printer, wireless device. The I/O components 520 may provide a natural user interface (NUI) that processes air gestures, voice, or other physiological inputs generated by a user. In some instances, inputs may be transmitted to an appropriate network element for further processing. An NUI may implement any combination of speech recognition, touch and stylus recognition, facial recognition, biometric recognition, gesture recognition both on screen and adjacent to the screen, air gestures, head and eye tracking, and touch recognition associated with displays on the computing device 500. The computing device 500 may be equipped with depth cameras, such as stereoscopic camera systems, infrared camera systems, RGB camera systems, and combinations of these, for gesture detection and recognition. Additionally, the computing device 500 may be equipped with accelerometers or gyroscopes that enable detection of motion. The output of the accelerometers or gyroscopes may be provided to the display of the computing device 500 to render immersive augmented reality or virtual reality.

Some embodiments of computing device 500 may include one or more radio(s) 524 (or similar wireless communication components). The radio 524 transmits and receives radio or wireless communications. The computing device 500 may be a wireless terminal adapted to receive communications and media over various wireless networks. Computing device 500 may communicate via wireless protocols, such as code division multiple access ("CDMA"), global system for mobiles ("GSM"), or time division multiple access ("TDMA"), as well as others, to communicate with other devices. The radio communications may be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types, of connections (i.e., a primary connection and a secondary connection). A short-range connection may include, by way of example and not limitation, a Wi-Fi® connection to a device (e.g., mobile hotspot) that provides access to a wireless communications network, such as a WLAN connection using the 802.11 protocol; a Bluetooth connection to another computing device is a second example of a short-range connection, or a near-field communication connection. A long-range connection may include a connection using, by way of example and not limitation, one or more of CDMA, GPRS, GSM, TDMA, and 802.16 protocols.

Many different arrangements of the various components depicted, as well as components not shown, are possible without departing from the scope of the claims below. Embodiments of the present invention have been described with the intent to be illustrative rather than restrictive. Alternative embodiments will become apparent to readers of this disclosure after and because of reading it. Alternative means of implementing the aforementioned can be completed without departing from the scope of the claims below. Certain features and sub-combinations are of utility and may be employed without reference to other features and sub-combinations and are contemplated within the scope of the claims.

What is claimed is:

1. A computer-implemented method for determining that a detected visit at an identified place of interest is an extended visit, the method comprising:

obtaining pieces of location history data collected via a computing device associated with a user account, wherein each obtained piece of location history data corresponds to a place of interest defined in a profile associated with the user account, is associated with at least one signal detected by the computing device at the defined place of interest, and is further associated with temporal data that corresponds to the at least one detected signal;

based on the associated temporal data, identifying at least a portion of the obtained pieces of location history data that represents at least one short visit at the defined place of interest;

generating a set of conditions employable to determine extended visits at the defined place of interest, the set of conditions being generated based at least in part on the identified portion of the obtained pieces of location history data;

detecting a location visit associated with the defined place of interest based on location data being received from the computing device;

at a duration of time after detecting the location visit associated with the defined place of interest, pinging the computing device for updated location data;

receiving the updated location data from the computing device;

determining that the detected location visit is extended based at least in part on the updated location data and the generated set of conditions; and transmitting an extended visit communication to the computing device based on the determination that the detected location visit is extended, wherein the transmitting causes the computing device to present the extended visit communication.

2. The method of claim 1, wherein the corresponding temporal data includes a time that the at least one signal is detected.

3. The method of claim 2, wherein at least the identified portion of the pieces of location history data includes the temporal data that corresponds to a plurality of detected signals that are associated with each short visit.

4. The method of claim 1, wherein the conditions include at least a minimum number of detected signals and a minimum duration.

5. The method of claim 1, wherein the at least one signal comprises at least one of a Wi-Fi signal, a Bluetooth signal, geocache data, and GPS coordinates.

6. The method of claim 1, wherein the detected location visit of the computing device at the identified place of interest is determined to be extended based further in part on contextual information that is associated with the user account and/or corresponds to the identified place of interest.

7. The method of claim 6, wherein the contextual information associated with the user account includes at least one of a stored daily routine, current time of day, current day of week, current season, relevant event information, current traffic information, current and/or future weather information, accompanying party information, and contextual information associated with the accompanying party.

8. A computer storage medium storing computer-useable instructions that, when used by one or more computing devices, cause the one or more computing devices to perform operations for determining that a detected visit is an extended visit, the operations comprising:

receiving pieces of location history data corresponding to the identified place of interest from a computing device associated with a user account, wherein each piece of location history data of the received pieces of location history data is associated with the user account, references at least one signal detected at the identified place of interest by the computing device, and further references temporal data that corresponds to the at least one detected signal;

identifying, for the user account, at least a portion of the received pieces of location history data that represents at least one short visit at the identified place of interest;

generating conditions for determining that detected location visits at the identified place of interest are extended based on at least the identified portion of the received pieces of location history data;

detecting a location visit of the computing device at the identified place of interest based at least in part on receiving a first piece of location data transmitted from the computing device;

at a duration of time after detecting the location visit, pinging the computing device for an updated piece of location data;

receiving the updated piece of location data transmitted from the computing device;

determining that the location visit of the computing device at the identified place of interest is extended based at least in part on the generated conditions, the first piece of location data, and the updated piece of location data; and transmitting an extended visit communication to the computing device based on the location visit being determined extended, wherein the transmitting causes the computing device to present the extended visit communication.

9. The storage medium of claim 8, wherein the corresponding temporal data includes a time that the at least one signal is detected.

10. The storage medium of claim 9, wherein at least the identified portion of the pieces of location history data includes the temporal data that corresponds to a plurality of detected signals that are associated with each short visit of the at least one short visit.

11. The storage medium of claim 8, wherein the conditions include at least a minimum number of signals and a minimum duration.

12. The storage medium of claim 8, wherein the at least one signal comprises at least one of a Wi-Fi signal, a Bluetooth signal, geocache data, and GPS coordinates.

13. The storage medium of claim 8, wherein the location visit of the computing device at the identified place of interest is determined to be extended based further on contextual information that is associated with the user account and corresponds to the identified place of interest.

14. The storage medium of claim 13, wherein the contextual information associated with the user account includes at least one of a stored daily routine, current time of day, current day of week, current season, relevant event information, current traffic information, current and/or future weather information, accompanying party information, and contextual information associated with the accompanying party.

15. A system for determining that a detected visit at an identified place of interest is an extended visit, the system comprising:

at least one processor and a memory which provides computer-executable instructions to the at least one processor;

a data receiving component which receives pieces of location history data from a computing device associated with an account, wherein the pieces of location history data reference at least one signal detected at an identified place of interest, and further reference temporal data that corresponds to the at least one detected signal, wherein each received piece of location history data is associated with the user account;

a condition generation component which generates conditions employable to determine whether location visits at the identified place of interest are extended based on at least a portion of pieces of location history data determined to correspond to at least one short visit at the identified place of interest; and a visit processing component which pings the computing device for updated location information at a duration of time after an initial signal corresponding to the identified place of interest is received, and determines that a detected location visit at the identified place of interest is extended based on the generated conditions and one or more updated pieces of location history data corresponding to the identified place of interest being received from the computing device.

16. The system of claim 15, the system further comprising:
   a data selection component for:
   determining the portion of the pieces of location history data that correspond to at least one short visit at the identified place of interest, and
   selecting the determined portion of the corresponding pieces of location history data, wherein the conditions are generated based on the selected portion.

17. The system of claim 15, wherein the temporal data includes a time that the at least one signal is detected.

18. The system of claim 17, wherein the at least a portion of the pieces of location history data includes the temporal data that corresponds to the at least one detected signal.

19. The system of claim 15, wherein the at least one signal comprises at least one of a Wi-Fi signal, a Bluetooth signal, geocache data, and GPS coordinates.

20. The system of claim 15, wherein the detected location visit is determined to be extended based further on contextual information that is associated with the user account and corresponds to the identified place of interest.

* * * * *